United States Patent
Rao et al.

(10) Patent No.: US 10,715,849 B2
(45) Date of Patent: Jul. 14, 2020

(54) AUTOMATICALLY GENERATING A RECOMMENDATION BASED ON AUTOMATIC AGGREGATION AND ANALYSIS OF DATA

(71) Applicant: Accenture Global Solutions Limited, Dublin (IE)

(72) Inventors: Srikanth G. Rao, Bangalore (IN); Ranjana Bhalchandra Narawane, Mumbai (IN); Amar Ratanlal Bafna, Mumbai (IN); Dongay Choudary Nuvvula, Bangalore (IN); Rati Rajendra Mangal, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 485 days.

(21) Appl. No.: 15/297,673

(22) Filed: Oct. 19, 2016

(65) Prior Publication Data
US 2018/0035142 A1 Feb. 1, 2018

(30) Foreign Application Priority Data
Jul. 27, 2016 (IN) .............................. 201641025690

(51) Int. Cl.
*H04H 60/32* (2008.01)
*H04N 21/25* (2011.01)
(Continued)

(52) U.S. Cl.
CPC ......... *H04N 21/252* (2013.01); *H04N 21/266* (2013.01); *H04N 21/2665* (2013.01); *H04N 21/4667* (2013.01); *H04N 21/4668* (2013.01)

(58) Field of Classification Search
CPC .............. H04N 21/252; H04N 21/266; H04N 21/2665; H04N 21/4667
(Continued)

(56) References Cited

U.S. PATENT DOCUMENTS 9,760,399 B1 * 9/2017 Fraser ..................... G06F 9/485
2009/0144129 A1 * 6/2009 Grouf ..................... G06F 21/10
705/14.42

(Continued)

OTHER PUBLICATIONS

Wikipedia, "Audience measurement," https://en.wikipedia.org/wiki/Audience_measurement, May 3, 2016, 10 pages.

*Primary Examiner* — Jivka A Rabovianski
(74) *Attorney, Agent, or Firm* — Harrity & Harrity, LLP

(57) ABSTRACT

A system may receive, from multiple data providers or multiple platforms, data associated with content, a content provider that provides the content, and multiple channels via which the content is provided or consumed. The data may include first data, received from a first data provider or a first platform, that is associated with a different file type than second data received from a second data provider or a second platform. The system may include a data model associated with the first data and the second data. The system may aggregate the data from the multiple data providers or the multiple platforms. The system may identify a relationship between the first data and the second data. The first data and the second data may be different types of data. The system may perform an action based on the relationship between the first data and the second data.

20 Claims, 6 Drawing Sheets

(51) Int. Cl.
*H04N 21/466* (2011.01)
*H04N 21/266* (2011.01)
*H04N 21/2665* (2011.01)

(58) Field of Classification Search
USPC .......................................... 725/14, 13, 36, 44
See application file for complete search history.

(56) References Cited

U.S. PATENT DOCUMENTS

2010/0251304 A1* 9/2010 Donoghue ......... H04N 5/44543
 725/46
2015/0106157 A1* 4/2015 Chang .................... G06F 17/27
 705/7.29

\* cited by examiner

AUTOMATICALLY GENERATING A RECOMMENDATION BASED ON AUTOMATIC AGGREGATION AND ANALYSIS OF DATA

RELATED APPLICATION

This application claims priority under 35 U.S.C. § 119 to Indian Patent Application No. 201641025690, filed on Jul. 27, 2016, the content of which is incorporated by reference herein in its entirety.

BACKGROUND

Audience measurement involves the monitoring and measurement of an audience in terms of the size of the audience, demographics, and/or other factors. For example, television viewership may be measured by program, episode, viewer age group, or the like. Audience measurement may be performed for the purpose of making programming choices, pricing advertisements, or the like.

SUMMARY

According to some possible implementations, a system may include one or more processors to receive, from multiple data providers or multiple platforms, data associated with content, a content provider that provides the content, and multiple channels via which the content is provided or consumed. The data may include first data, received from a first data provider or a first platform of the multiple data providers or the multiple platforms, that is associated with a different file type than second data received from a second data provider or a second platform of the multiple data providers or the multiple platforms. The system may include a data model associated with the first data and the second data. The one or more processors may aggregate the data from the multiple data providers or the multiple platforms. The one or more processors may identify a relationship between the first data and the second data. The first data and the second data may be different types of data. The one or more processors may perform an action based on the relationship between the first data and the second data.

According to some possible implementations, a method may include receiving, by a system, a first type of data from a first platform and a second type of data from a second platform. The first type of data or the second type of data may be associated with content provided by a content provider via a channel. The first type of data may be associated with a first file type. The second type of data may be associated with a second file type. The method may include aggregating, by the system, the first type of data and the second type of data. The method may include determining, by the system, a relationship between the first type of data and the second type of data based on aggregating the first type of data and the second type of data. The relationship may indicate whether the first type of data affects the second type of data. The method may include performing, by the system, an analysis of the relationship between the first type of data and the second type of data based on determining the relationship between the first type of data and the second type of data. The method may include performing, by the system, an action based on the analysis of the relationship.

According to some possible implementations, a non-transitory computer-readable medium may store instructions that, when executed by one or more processors, cause the one or more processors to receive, from a plurality of sources, data associated with content, a content provider that provides the content, or multiple channels via which the content is provided or consumed. The data may include first data associated with a first file type and second data associated with a second file type. The first data may be a different type of data than the second data. The one or more instructions may cause the one or more processors to perform an analysis of the first data and the second data to determine one or more relationships between the first data and the second data. The analysis may be associated with causing a system to perform one or more actions based on the one or more relationships. The one or more instructions may cause the one or more processors to determine the one or more relationships between the first data and the second data based on the analysis. The one or more relationships may indicate whether the first data affects the second data. The one or more instructions may cause the one or more processors to perform the one or more actions based on the one or more relationships between the first data and the second data.

DETAILED DESCRIPTION

The following detailed description of example implementations refers to the accompanying drawings. The same reference numbers in different drawings may identify the same or similar elements.

A content provider or content distributor may wish to analyze data associated with performance and/or consumption of content across different distribution channels and/or different consumption channels. In addition, the content provider may wish to determine a manner in which the performance and/or consumption of the content affects costs and/or revenue of the content provider.

The content provider may have access to data from multiple sources, such as multiple rating providers (e.g., The Nielsen Company, Rentrak®, comScore®, Broadcasters Audience Research Board (BARB), Broadcast Audience Research Council India (BARC), etc.). However, using data from multiple sources may include several challenges. For example, the content provider may have difficulty analyzing the data from different distribution channels and/or different consumption channels (e.g., due to different sources providing different types of formats of data). In addition, the content provider may have difficulty analyzing relationships among data from multiple sources.

Implementations described herein provide a data capture, data storage, data aggregation, and analytics system (hereinafter referred to as "aggregation and analytics system") capable of aggregating data, such as content ratings, associated with multi-platform content from multiple sources or multiple providers and analyzing relationships among the data. In addition, the aggregation and analytics system may automatically generate a recommendation for an action to perform, with respect to the content, based on analyzing the data. Further, the aggregation and analytics system may automatically perform an action based on analyzing the data and/or automatically recommend an action based on analyzing the data.

In this way, the aggregation and analytics system conserves processing resources associated with analyzing data from multiple sources by reducing or eliminating the need to manually use a system and/or a device to analyze data from multiple sources. Furthermore, the aggregation and analytics system enables assessment of data across different distribution channels and/or different consumption channels, thereby improving an assessment of data from different distribution channels and/or different consumption channels. Further, the aggregation and analytics system increases an efficiency of analyzing data by analyzing metrics in a consolidated manner using a single system rather than in a disparate manner using multiple systems or tools. Further, the aggregation and analytics system conserves time associated with analyzing data from multiple sources and across different distribution channels and/or consumption channels, thereby improving an efficiency of analyzing the data.

Figure 1A:
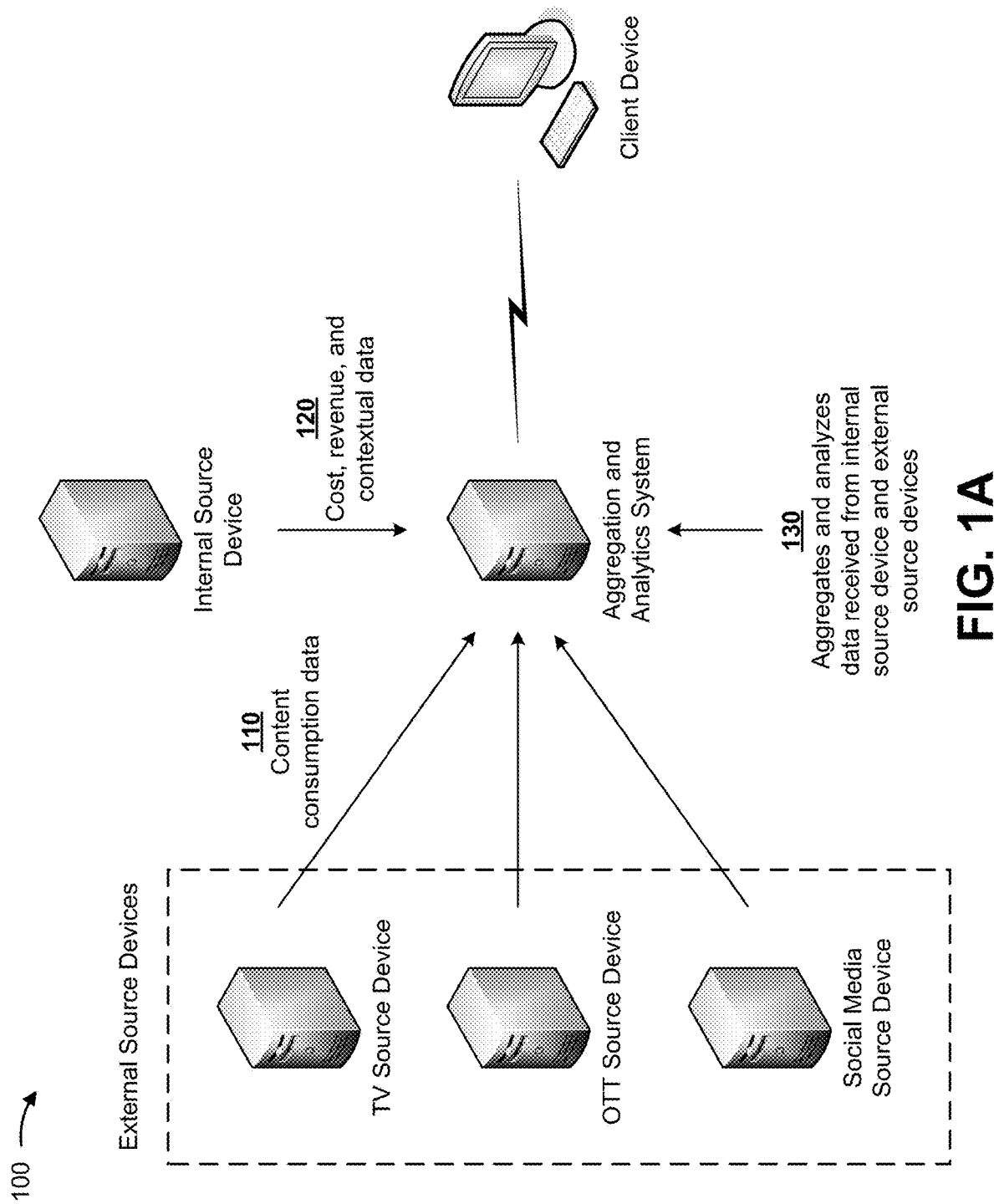
FIGS. 1A and 1B are diagrams of an overview of an example implementation described herein.
Figure 1B:
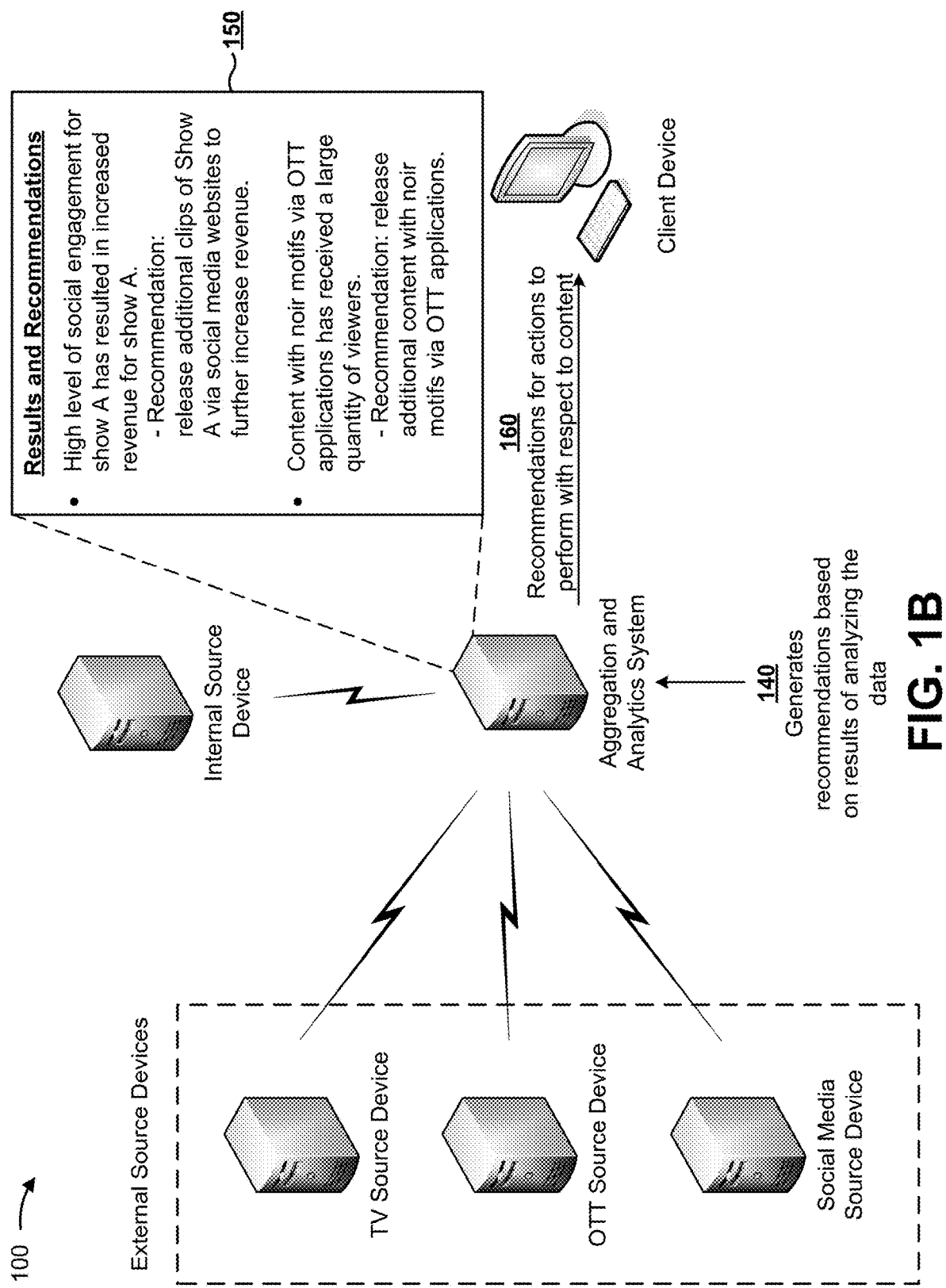

FIGS. 1A and 1B are diagrams of an overview of an example implementation 100 described herein. As shown in FIG. 1A, example implementation 100 may include an aggregation and analytics system which may communicate with a client device (e.g., a computer or a mobile phone) and may receive content-related data from an internal source device and/or from external source devices. The external source devices may include a television (TV) source device and/or an over-the-top (OTT) source device associated with a rating provider (e.g., The Nielsen Company or comScore®), and/or a social media source device associated with a social media data provider (e.g., DataSift®, Radian6®, etc.). The internal source device may include a content distributor-owned or content provider-owned device that provides data associated with content and/or data associated with the content distributor or the content provider (e.g., metrics, such as cost data, revenue data, etc.).

As shown by reference number 110, the aggregation and analytics system may receive content consumption data from one or more of the external source devices. The content consumption data may include data related to consumers (e.g., a quantity of consumers or an amount of time spent by each consumer consuming the content), to channels (e.g., a distribution channel or a consumption channel via which the content is consumed), or the like.

As shown by reference number 120, the aggregation and analytics system may receive cost data, revenue data, and/or contextual data from the internal source device. Cost data may include data that identifies a cost of providing the content, such as a production cost or a distribution cost. Revenue data may include data that identifies an amount of revenue that may be received from providing the content, such as advertising revenue or subscription revenue. Contextual data may include data that identifies a context of the content, such as a character, a theme, or an emotion associated with a particular portion of the content. The context of the content may be identified using time-based metadata for the content (e.g., time period data for the content mapped to content data).

As shown by reference number 130, the aggregation and analytics system may aggregate and analyze the data received from the internal source device and the external source devices. The aggregation and analytics system may aggregate the data based on the source of the data (e.g., same or different source devices) and/or based on an identifier that identifies the content (e.g., a show, an episode, or a type of content) or a channel via which the content is provided (e.g., a distribution channel or a consumption channel). The aggregation and analytics system may analyze the data by performing a contextual analysis, a sentiment analysis, a social media analysis, a social engagement analysis, a consumption analysis (e.g., a viewership analysis or an audience analysis), predictive analytics, descriptive analytics, or the like.

The aggregation and analytics system may forecast data based on historical trends or predict data using statistical modeling/techniques and/or machine learning. As shown in FIG. 1B, and as shown by reference number 140, the aggregation and analytics system may generate recommendations based on analyzing the data (e.g., based on forecasting data and/or using predictive analytics to predict data). For example, the recommendations may be associated with a character, person, or sports team, with a type, motif, theme, or emotion, with production of the content, with advertising associated with the content (e.g., contextual advertising), increasing revenue, decreasing make-good or corrective/rerun advertisements, or the like. As shown by reference number 150, as a particular example where analysis determines that a high level of social engagement for show A has resulted in increased revenue for show A, the aggregation and analytics system may generate a recommendation to release additional clips of show A via social media websites to further increased revenue. As another example, where analysis determines that content with noir motifs via OTT applications has received a large quantity of consumers, the aggregation and analytics system may generate a recommendation to release additional content with noir motifs via OTT applications.

As shown by reference number 160, the aggregation and analytics system may provide recommendations to the client device for actions to perform with respect to content and/or a content provider/distributor, such as cost recommendations or revenue recommendations. For example, the aggregation and analytics system may transmit a message to a content producer indicating a result of an analysis, may purchase advertising for the content or increase the price of advertising to be presented during the content, may schedule a meeting among content producers to discuss adding, decreasing, or cancelling content, or the like.

In this way, the aggregation and analytics system conserves processing resources associated with analyzing data from multiple sources. Furthermore, the aggregation and analytics system enables assessment of data across different distribution channels and/or different consumption channels. Further, the aggregation and analytics system increases an efficiency of analyzing data by analyzing metrics in a consolidated manner using a single system rather than in a disparate manner using multiple systems or tools. Further, the aggregation and analytics system conserves time associated with analyzing data from multiple sources and across different distribution channels and/or consumption channels.

As indicated above, FIGS. 1A and 1B are provided merely as an example. Other examples are possible and may differ from what was described with regard to FIGS. 1A and 1B.

Figure 2A:
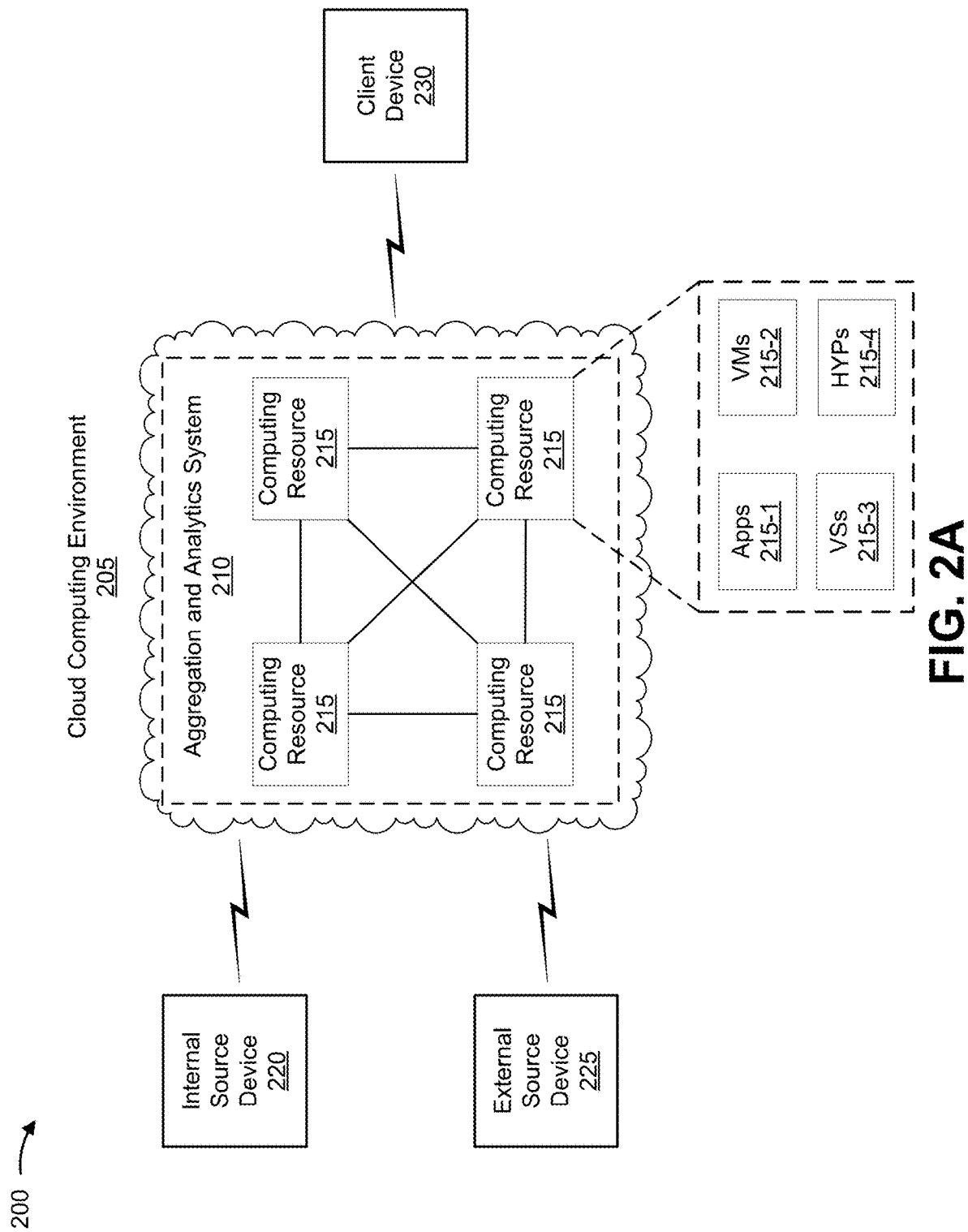
FIGS. 2A and 2B are diagrams of an example environment in which systems and/or methods, described herein, may be implemented.
Figure 2B:
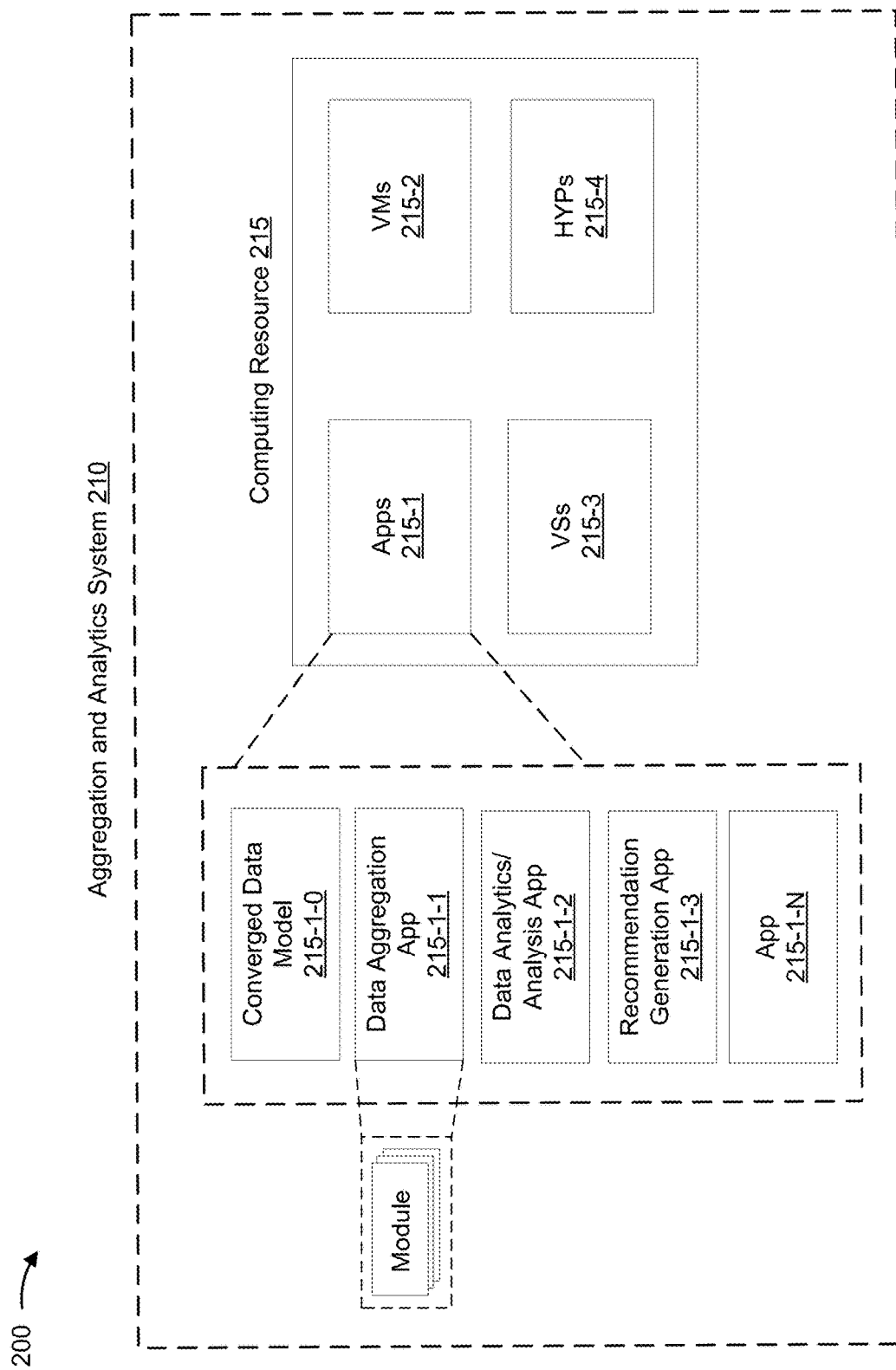

FIGS. 2A and 2B are diagrams of an example environment 200 in which systems and/or methods, described herein, may be implemented. As shown in FIG. 2A, environment 200 may include a cloud computing environment 205, an aggregation and analytics system 210, a set of computing resources 215, an internal source device 220, an external source device 225, and a client device 230. Devices of environment 200 may interconnect via wired connections, wireless connections, or a combination of wired and wireless connections. Although described with respect to a cloud computing environment, the implementations described herein may be implemented on a premises of a content provider or a content distributor (e.g., locally implemented), at a location different than the premises of the content provider or the content distributor (e.g., remotely implemented), in a cloud computing environment (e.g., virtually implemented), or a using a combination of local, remote, and/or virtual implementations.

Cloud computing environment 205 includes an environment that hosts aggregation and analytics system 210. Cloud computing environment 205 may provide computation, software, data access, storage, etc. services that do not require end-user knowledge of a physical location and configuration of system(s) and/or device(s) that host aggregation and analytics system 210. As shown, cloud computing environment 205 may include a group of computing resources 215 (referred to collectively as "computing resources 215" and individually as "computing resource 215").

Computing resource 215 includes one or more personal computers, workstation computers, server devices, or other types of computation and/or communication devices. In some implementations, computing resource 215 may host aggregation and analytics system 210. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2A, computing resource 215 includes a group of cloud resources, such as one or more applications ("APPs") 215-1, one or more virtual machines ("VMs") 215-2, one or more virtualized storages ("VSs") 215-3, or one or more hypervisors ("HYPs") 215-4.

Application 215-1 includes one or more software applications that may be provided to or accessed by one or more devices of environment 200. Application 215-1 may eliminate a need to install and execute the software applications on devices of environment 200. For example, application 215-1 may include software associated with aggregation and analytics system 210 and/or any other software capable of being provided via cloud computing environment 205. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., client device 230), and may manage infrastructure of cloud computing environment 205, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 may provide hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Internal source device 220 includes one or more devices capable of receiving, generating, storing, processing, and/or providing data associated with a content provider and/or content provided by the content provider. For example, internal source device 220 may include a server device (e.g., a proxy server, a web server, a host server, a storage server, a server in a data center or in a cloud computing environment, etc.) or a similar type of device. In some implementations, internal source device 220 may provide the data to aggregation and analytics system 210, as described elsewhere herein. In some implementations, internal source device 220 may be internal to (e.g., owned by, licensed for use by, etc.) a content provider that delivers content.

External source device 225 includes one or more devices capable of receiving, generating, storing, processing, and/or providing data associated with consumption of the content provided by the content provider. For example, external source device 225 may include a server device, a content distribution device, a cable headend device, or a similar type of device. In some implementations, external source device 225 may provide the data to aggregation and analytics system 210, as described elsewhere herein. In some implementations, external source device 225 may not be internal to (e.g., not owned by, not licensed for use by, etc.) the content provider that delivers the content.

Client device 230 includes one or more devices capable of receiving, generating, storing, processing, and/or providing data associated with a content provider, content provided by the content provider, and/or consumption of the content. For example, client device 230 may include a communication and/or computing device, such as a desktop computer, a laptop computer, a tablet computer, a server device, a mobile phone (e.g., a smart phone or a radiotelephone), a wearable communication device (e.g., a smart wristwatch, an activity band, or a pair of smart eyeglasses), a gaming device, or a similar type of device. In some implementations, client device 230 may receive a result of an analysis by aggregation and analytics system 210 and/or may receive a recommendation generated by aggregation and analytics system 210, as described elsewhere herein. Additionally, or alternatively, client device 230 may provide the result and/or the recommendation for display (e.g., via a display of client device 230), as described elsewhere herein.

As shown in FIG. 2B, applications 215-1 may include one or more applications, such as applications 215-1-0 through applications 215-1-N (N≥0). For example, applications 215-1 may include converged data model 215-1-0, data aggregation application 215-1-1, data analytics/analysis application 215-1-2, and/or recommendation generation application 215-1-3. In some implementations, aggregation and analytics system 210 may use applications 215-1 to process data received from multiple sources and/or to perform an action. For example, aggregation and analytics system 210 may use converged data model 215-1-0 to converge different types of data or data from multiple sources and/or may use data aggregation application 215-1-1 to aggregate data from the multiple sources.

As further shown in FIG. 2B, applications 215-1 may include one or more modules (e.g., software modules or application modules). For example, data analytics/analysis application 215-1-2 may include one or more modules to process and/or interpret data, such as a normalization module to normalize data, a machine learning module to identify patterns in historical data to enable identification of patterns in received data, a data mining module to identify trends in data or relationships among different types of data, and/or a natural language processing module to parse data to identify keywords or phrases.

In some implementations, applications 215-1 may receive data when aggregation and analytics system 210 receives data from internal source device 220 and/or external source device 225. Additionally, or alternatively, a particular application 215-1 may receive data from another application 215-1 (e.g., output from the other application 215-1). In some implementations, application 215-1 may provide output to client device 230.

The number and arrangement of devices and networks shown in FIGS. 2A and 2B are provided as an example. In practice, there may be additional devices, fewer devices, different devices, or differently arranged devices than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) of environment 200 may perform one or more functions described as being performed by another set of devices of environment 200.

Figure 3:
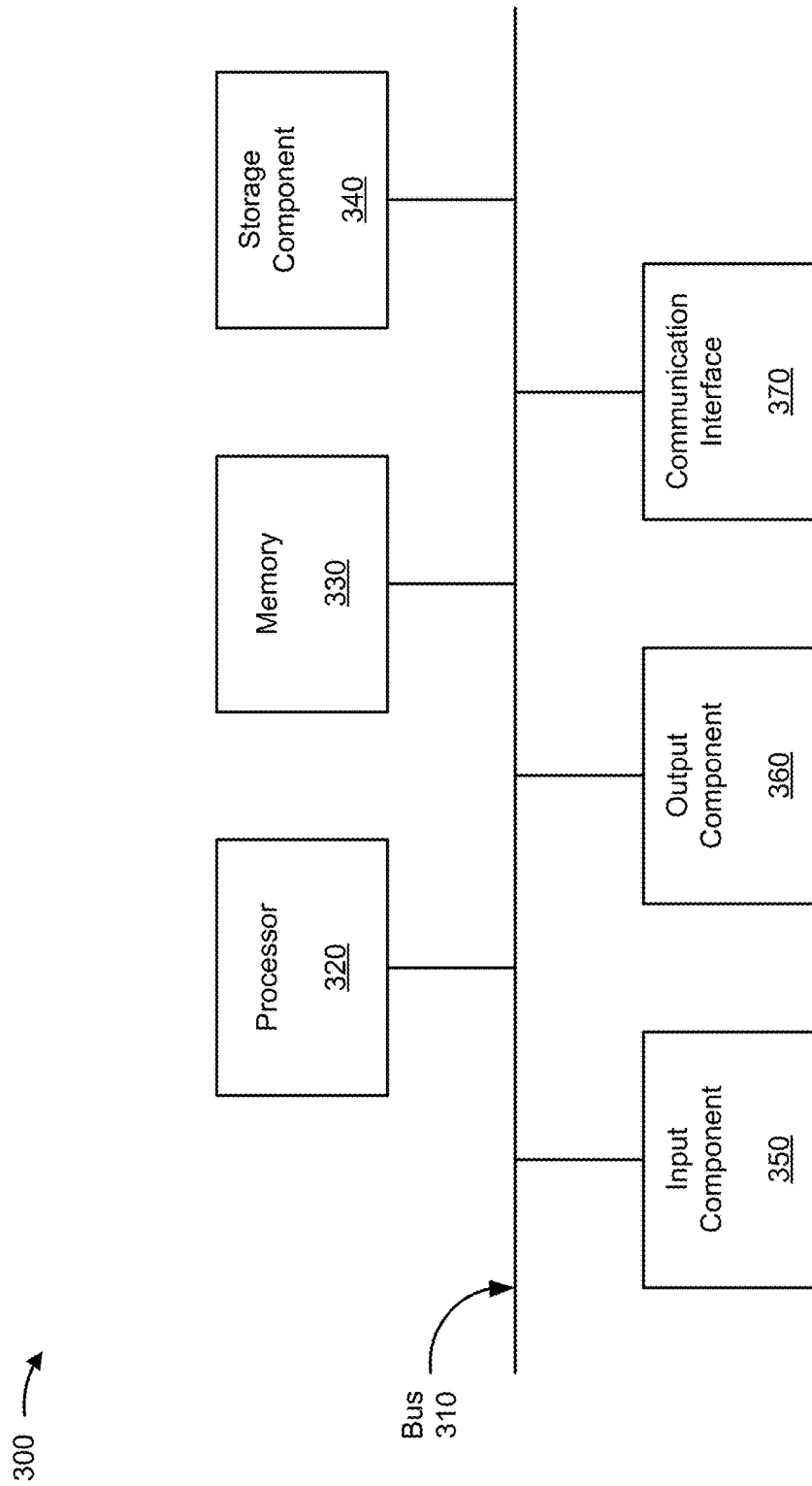
FIG. 3 is a diagram of example components of one or more devices of FIGS. 2A and 2B.

FIG. 3 is a diagram of example components of a device 300. Device 300 may correspond to cloud computing environment 205, aggregation and analytics system 210, computing resources 215, internal source device 220, external source device 225, and/or client device 230. In some implementations, cloud computing environment 205, aggregation and analytics system 210, computing resources 215, internal source device 220, external source device 225, and/or client device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
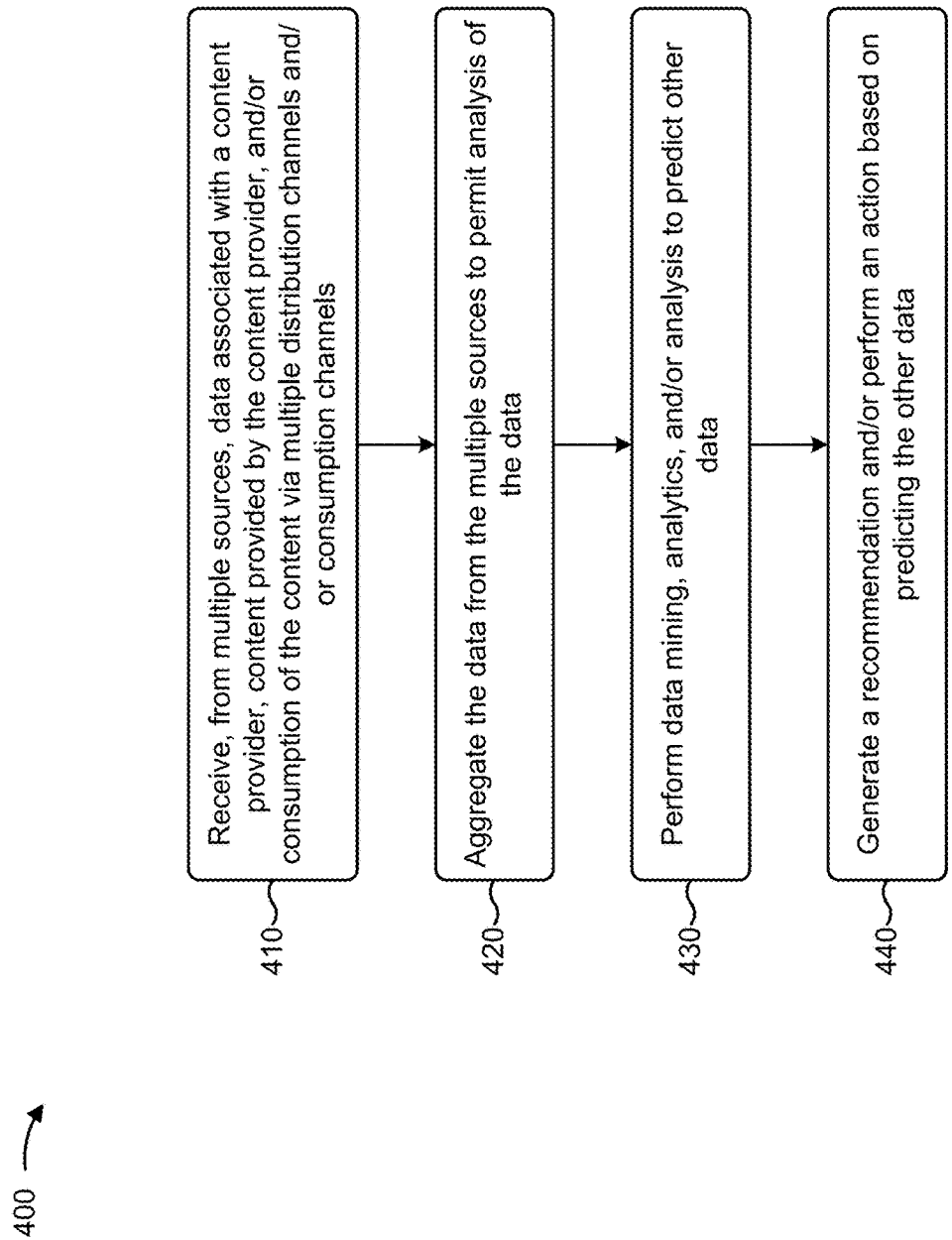
FIG. 4 is a flow chart of an example process for automatically generating a recommendation for content based on automatic aggregation and analysis of data.

FIG. 4 is a flow chart of an example process 400 for automatically generating a recommendation for content based on automatic aggregation and analysis of data. In some implementations, one or more process blocks of FIG. 4 may be performed by aggregation and analytics system 210. In some implementations, one or more process blocks of FIG. 4 may be performed by another device or a group of devices separate from or including aggregation and analytics system 210, such as internal source device 220, external source device 225, and/or client device 230.

As shown in FIG. 4, process 400 may include receiving, from multiple sources, data associated with a content provider, content provided by the content provider, and/or consumption of the content via multiple distribution channels and/or consumption channels (block 410). For example, aggregation and analytics system 210 may receive the data.

In some implementations, aggregation and analytics system 210 may receive data from internal source device 220 and/or external source device 225. In some implementations, aggregation and analytics system 210 may receive the data associated with the content provider and/or the data associated with the content from internal source device 220. Additionally, or alternatively, aggregation and analytics system 210 may receive the data associated with consumption of the content, such as playing or accessing the content, from external source device 225 (e.g., from an audience measurement entity). In some implementations, aggregation and analytics system 210 may receive data from across different platforms. For example, aggregation and analytics system 210 may receive data from a platform associated with content provider data, another platform associated with content data, and/or another platform associated with channel data. As another example, aggregation and analytics system 210 may receive data associated with content, a context of the content, or consumption of the content via TV/OTT channels.

In some implementations, the data may include data associated with a content provider. For example, the data may include cost data that identifies a cost (e.g., a production cost or a distribution cost) to the content provider for providing the content. As another example, the data may include revenue data that identifies an amount of revenue (e.g., advertising revenue or content subscription revenue) received by the content provider based on providing the content.

In some implementations, the data may include data associated with the content provided by the content provider. For example, the data may include content data that identifies a season, an episode, or a genre of a show, a type of the content (e.g., live, pre-recorded, TV show, or sporting event), names (e.g., individual names, group names, or character names that appear in the content), or portions of a sporting match. As a particular example, in the case of a football game, the data may include content data that identifies portions of the football game (e.g., first quarter, second quarter, scoring plays, or portions of the content during which team A is on offense and/or team B is on defense).

In some implementations, the data may include contextual data associated with the content. For example, the data may include content data associated with each scene, minute, or frame of the content. As another example, the data may include content tags that identify additional information associated with the content, such as motifs, emotions, themes, characters present in a particular scene or frame of the content, actors/actresses present in a particular scene or frame of the content, or keywords that describe the plot of a particular scene or frame of the content.

In some implementations, the data may include data associated with consumption of the content. For example, the data may include a quantity of consumers of the content, an amount of time each consumer spent consuming the content, or the like. In some implementations, the data may include data associated with consumption of the content via one or more distribution channels (e.g., TV, such as cable TV, internet protocol (IP) TV, OTT applications and/or websites, social media channels, such as social media websites, platforms, and/or applications, etc.). Additionally, or alternatively, the data may include data associated with consumption of the content via one or more consumption channels (e.g., a personal computer, a tablet computer, or a smartphone).

In some implementations, the data may include one or more identifiers. For example, the data may include content identifiers that identify a show, a season, an episode, a sporting event, or the like, associated with the data. For example, the data may include distribution channel identifiers that identify the distribution channel associated with data and/or consumption channel identifiers that identify the consumption channel associated with data. In some implementations, the identifiers may enable mapping of different data, as described below.

In some implementations, the data may be associated with a file type and/or format. For example, the data may be associated with a hypertext markup language (HTML) file, an extensible markup language (XML) file, a text file, a comma-separated values (CSV) file, a portable document format (PDF) file, a Word file, an Excel file, a flat file, such as a text file or a binary file, or the like). In some implementations, the data may be associated with different file types and/or formats. For example, aggregation and analytics system 210 may receive first data in an HTML file from a first platform or system and second data in a CSV file from a second platform or system.

As further shown in FIG. 4, process 400 may include aggregating the data from the multiple sources to permit analysis of the data (block 420). For example, aggregation and analytics system 210 may aggregate the data.

In some implementations, aggregation and analytics system 210 may store and aggregate consumption data, cost data, revenue data, content data, and/or contextual data from the multiple sources. In some implementations, aggregation and analytics system 210 may aggregate the data to permit aggregation and analytics system 210 to analyze the data.

In some implementations, aggregation and analytics system 210 may aggregate the data based on the source of the data. In some implementations, aggregation and analytics system 210 may aggregate data from different sources. For example, aggregation and analytics system 210 may aggregate data from internal source device 220 and external source device 225. Additionally, or alternatively, aggregation and analytics system 210 may aggregate the data from the same source. For example, aggregation and analytics system 210 may aggregate first data from internal source device 220 and second data from internal source device 220.

In some implementations, aggregation and analytics system 210 may aggregate the data using an identifier. In some implementations, aggregation and analytics system 210 may aggregate the data using an identifier included in the data. For example, aggregation and analytics system 210 may aggregate the data using an identifier included in the data that identifies the content (e.g., a show, an episode, or a type). As another example, aggregation and analytics system 210 may aggregate the data using an identifier that identifies the distribution channel and/or the consumption channel.

In some implementations, aggregation and analytics system 210 may map data in association with aggregating the data. In some implementations, aggregation and analytics system 210 may map data based on content. For example, aggregation and analytics system 210 may map data associated with the same content (e.g., content data and cost data associated with the same content, or contextual data and revenue data associated with the same content). As another example, aggregation and analytics system 210 may map data associated with different content (e.g., contextual data and revenue data associated with different content).

Additionally, or alternatively, aggregation and analytics system 210 may map data based on a distribution channel and/or a consumption channel. For example, aggregation and analytics system 210 may map data associated with the same distribution channel and/or consumption channel (e.g. content data and cost data for the same distribution channel and/or the same consumption channel). As another example, aggregation and analytics system 210 may map data associated with different distribution channels and/or consumption channels (e.g., contextual data and revenue data for the same content across different distribution channels and/or different consumption channels).

In some implementations, aggregation and analytics system 210 may aggregate and/or map data associated with different file types and/or formats. For example, aggregation and analytics system 210 may aggregate cost data in a CSV file and cost data in an HTML file. As another example, aggregation and analytics system 210 may map revenue data in an Excel file and content data in a PDF file.

In some implementations, aggregation and analytics system 210 may aggregate and/or map data from different sources. For example, aggregation and analytics system 210 may aggregate and/or map data from different internal source devices 220, different external source devices 225, and/or different platforms.

In some implementations, aggregation and analytics system 210 may aggregate and/or map the data using a technique. For example, aggregation and analytics system 210 may aggregate and/or map the data using an algorithm, machine learning, computational statistics, or artificial intelligence to aggregate and/or map the data. Continuing with the previous example, aggregation and/or analytics system 210 may aggregate and/or map data from different sources, data associated with different file types, or different types of data (e.g., content data, content provider data, etc.) based on the technique indicating to aggregate and/or map the data.

In some implementations, aggregation and analytics system 210 may extract data from a file, in association with aggregating and/or mapping the data, using a technique. For example, aggregation and analytics system 210 may extract the data based on identifying a pattern (e.g., a pattern and/or combination of characters, words, terms, etc. that appear in text of a file). As another example, aggregation and analytics system 210 may extract the data using a machine learning technique, such as a pattern recognition technique, a data mining technique, a heuristic technique, or a supervised learning technique.

In this way, aggregation and analytics system 210 may conserve memory resources by reducing or eliminating duplicate storage of data across multiple systems and/or devices. Furthermore, aggregation and analytics system 210 may conserve processing resources associated with using data by reducing or eliminating the need to access data stored in multiple sources.

As further shown in FIG. 4, process 400 may include performing data mining, analytics, and/or analysis to predict other data (block 430). For example, aggregation and analytics system 210 may analyze the data to generate the recommendation.

In some implementations, aggregation and analytics system 210 may analyze the data received from multiple sources. In some implementations, aggregation and analytics system 210 may analyze the data to generate a recommendation (e.g., a recommendation associated with adjusting the manner in which the content is provided or a recommendation associated with providing different and/or additional content).

In some implementations, aggregation and analytics system 210 may normalize the data received from multiple sources (e.g., to enable analysis, comparison, aggregation, and/or mapping of the data). For example, aggregation and analytics system 210 may modify first data from a first source and second data from a second source so that the first data and the second data can be analyzed using the same measurement scale.

In some implementations, aggregation and analytics system 210 may select an analysis technique to use to analyze the data. In some implementations, aggregation and analytics system 210 may select the analysis technique using machine learning. For example, aggregation and analytics system 210 may select the analysis technique by learning that a particular analysis technique is to be used for a particular type of data, for data from a particular source, for a particular recommendation to be provided, for a particular type of content, or for different channels (e.g., based on a training set, prior manual selection by a user of aggregation and analytics system 210, etc.).

In some implementations, aggregation and analytics system 210 may use multiple analysis techniques. For example, aggregation and analytics system 210 may use a first analysis technique and a second analysis technique on the same data. As another example, aggregation and analytics system 210 may use multiple analysis techniques on different data. In some implementations, aggregation and analytics system 210 may use results from the multiple analysis techniques to perform an action and/or generate a recommendation.

In some implementations, aggregation and analytics system 210 may perform a contextual analysis. In some implementations, aggregation and analytics system 210 may perform a contextual analysis to determine a manner in which data associated with the content affects other data associated with the content. For example, aggregation and analytics system 210 may perform a contextual analysis to determine the manner in which a character, a theme, or an emotion present in the content affects a quantity of consumers of the content. As a particular example, scenes where character A is present may be associated with higher consumption (e.g., relative to scenes where character A is not present). In some implementations, aggregation and analytics system 210 may use mapped data to perform the contextual analysis. For example, aggregation and analytics system 210 may use contextual data mapped to consumption data to identify, or track, trends in consumption associated with the content (e.g., by identifying a trend of higher consumption for scenes where a particular character is present relative to scenes where the particular character is not present).

Additionally, or alternatively, aggregation and analytics system 210 may perform a sentiment analysis. In some implementations, aggregation and analytics system 210 may perform a sentiment analysis to determine a sentiment associated with the content (e.g., a positive or a negative sentiment). In some implementations, aggregation and analytics system 210 may perform the sentiment analysis using social media data (e.g., posts, likes, or dislikes, on a social media webpage). For example, aggregation and analytics system 210 may use natural language processing, text analysis, and/or computational linguistics to identify and parse social media posts to identify a sentiment associated with the social media posts. As another example, aggregation and analytics system 210 may compute a total quantity of positive indicators, such as a like or an up vote, and a total quantity of negative indicators, such as a dislike or a down vote, associated with the content and may determine whether the content is associated with a positive sentiment or negative sentiment based on whether the content is associated with a higher quantity of positive indicators or a higher quantity of negative indicators.

In some implementations, aggregation and analytics system 210 may identify social media data associated with the content. For example, aggregation and analytics system 210 may identify social media data by using hashtags, keywords, usernames, or the like, to identify social media posts associated with the content. In some implementations, aggregation and analytics system 210 may use natural language processing to parse the social media data and extract keywords (e.g., predefined keywords or user defined keywords). In some implementations, aggregation and analytics system 210 may identify a sentiment associated with the extracted keywords (e.g., by comparing the extracted keywords to sets of keywords associated with different sentiments). In some implementations, aggregation and analytics system 210 may perform the sentiment analysis using webpage data from non-social media webpages (e.g., news-related webpages, a webpage that includes ratings and/or reviews of the content, etc.).

Additionally, or alternatively, aggregation and analytics system 210 may perform a social media analysis. In some implementations, aggregation and analytics system 210 may perform a social media analysis to determine a manner in which social media users interact with, or consume, the content via a social media channel. In some implementations, aggregation and analytics system 210 may determine whether a social media user makes a positive indication (e.g., a like or a favorite), a negative indication (e.g., a dislike or a down vote), generates a comment, or shares the content (e.g., by sending a uniform resource identifier, such as a uniform resource locator (URL) to another user) in association with consuming the content.

In some implementations, aggregation and analytics system 210 may use data mining in association with performing the social media analysis. For example, aggregation and analytics system 210 may use data mining to determine a quantity of positive indicators, negative indicators, comments, or shares associated with the content during a time period and the manner in which the quantity of positive indicators, negative indicator, comments, or shares during the time period affected revenue from the content (e.g., by mapping data from a social media channel and revenue data generated from the social media channel). In some implementations, aggregation and analytics system 210 may use data mining in association with the social media analysis to identify demographics (e.g., gender, age, location, or interests) associated with consumers of the content based on data from a social media channel that is associated with users of the social media channel. Identifying demographics enables aggregation and analytics system 210 to identify content that may be of interest to particular consumers or to identify advertising opportunities associated with the particular consumers.

Additionally, or alternatively, aggregation and analytics system 210 may perform a social engagement analysis. In some implementations, aggregation and analytics system 210 may perform a social engagement analysis to determine a level of engagement of social media users with respect to the content. For example, aggregation and analytics system 210 may determine whether the level of social engagement with respect to the content is a high, medium, or low level of engagement. In some implementations, aggregation and analytics system 210 may generate a score that corresponds to the level of engagement when performing the social engagement analysis. For example, a play or an access of the content, in combination with a share or a like of the content, may cause the content to receive a higher score than a play or an access alone. As another example, multiple plays or multiple accesses of the content by the same user may cause the content to receive a higher score than a single play or access by a user.

Additionally, or alternatively, aggregation and analytics system 210 may perform a consumption analysis (e.g., a viewership analysis or an audience analysis). For example, aggregation and analytics system 210 may perform a total consumption analysis. As a particular example, aggregation and analytics system 210 may determine a total number of plays or accesses of the content, a total number of consumers during a particular time period, a peak number of consumers, a total number of consumers at particular points during a broadcast of the content, a change in the total number of consumers between broadcasts of the content, or the like.

In some implementations, aggregation and analytics system 210 may use a result of a consumption analysis to identify trends and/or patterns associated with content. For example, aggregation and analytics system 210 may compare a total number of consumers of content during a time period and a total number of consumers of the content during another time period to determine whether the consumption of the content is trending up or down. As another example, aggregation and analytics system 210 may map a result of the consumption analysis to revenue data to correspond trends or patterns in consumption of the content and revenue generated by the content.

Additionally, or alternatively, aggregation and analytics system 210 may perform predictive analytics. For example, aggregation and analytics system 210 may use machine learning to predict data associated with the content (e.g., consumption data, revenue data, or cost data). In some implementations, aggregation and analytics system 210 may perform predictive analytics based on another analysis. For example, aggregation and analytics system 210 may perform predictive analytics based on, or using a result of, a contextual analysis, a sentiment analysis, a consumption analysis, or the like. In some implementations, when aggregation and analytics system 210 perform predictive analytics based another analysis, aggregation and analytics system 210 may use a result of the other analysis to perform trend projection, as a training set for machine learning, etc.

Additionally, or alternatively, aggregation and analytics system 210 may perform descriptive analytics. For example, aggregation and analytics system 210 may compare a result of predictive analytics (e.g., predicted data, forecasted data, etc.) and the received data to determine differences between the result of the predictive analytics and the received data (e.g., by comparing a result of predictive analytics and the received data). In some implementations, aggregation and analytics system 210 may use a result of the descriptive analytics in association with the predictive analytics. For example, aggregation and analytics system 210 may use the result of the descriptive analytics as a training set for the machine learning associated with the predictive analytics, thereby improving the predictive analytics.

In some implementations, aggregation and analytics system 210 may determine or identify a relationship among data in association with analyzing the data. For example, aggregation and analytics system 210 may determine whether first data affects second data, whether a change in first data corresponds to a change in second data, or whether a change in first data causes a change in second data. In some implementations, aggregation and analytics system 210 may determine the relationship among data to enable aggregation and analytics system 210 to generate a recommendation for the content. For example, aggregation and analytics system 210 may determine a relationship among the data to determine whether an increase in content of a particular type increases revenue for the content provider. As another example, aggregation and analytics system 210 may determine a relationship among the data to determine whether an increase in a particular theme or motif present in the content increases consumption of the content.

By automatically analyzing the data, aggregation and analytics system 210 conserves processing resources that would be used to manually analyze the data using client device 230 or another device (e.g., processing resources consumed as a result of erroneous or duplicate analysis). In addition, automatically analyzing the data improves an efficiency of analyzing data, including different types of data or data associated with different file types/formats, from multiple sources by reducing or eliminating the need for manual analysis.

As further shown in FIG. 4, process 400 may include generating a recommendation and/or performing an action based on predicting the other data (block 440). For example, aggregation and analytics system 210 may generate the recommendation or perform another action based on analyzing the data.

In some implementations, aggregation and analytics system 210 may generate a recommendation for an action to take with respect to the content. In some implementations, the recommendation may be based on a result of analyzing the data. For example, aggregation and analytics system 210 may generate a recommendation for an action to take based on a sentiment analysis, a social media analysis, a contextual analysis, predictive analytics, etc. In some implementations, aggregation and analytics system 210 may generate a recommendation based on multiple analyses. For example, aggregation and analytics system 210 may generate a recommendation based on multiple of a sentiment analysis, a social media analysis, a contextual analysis, predictive analytics, etc. As another example, aggregation and analytics system 210 may generate a recommendation based on a first analysis of first data and a second analysis of second data.

In some implementations, aggregation and analytics system 210 may generate a recommendation associated with distribution of content. For example, aggregation and analytics system 210 may generate a recommendation to increase or decrease distribution of the content via a particular distribution channel and/or consumption channel (e.g., based on determining a trend in consumption of the content and/or revenue generated by the content via a distribution channel and/or a consumption channel). As a particular example, the recommendation may be based on a consumption analysis. In this case, aggregation and analytics system 210 may generate a recommendation to optimize content for a particular distribution channel and/or consumption channel based on a consumption analysis (e.g., by recommending that content be optimized for consumption via mobile devices or OTT applications based on an increased trend in consumption of the content via mobile devices or OTT applications).

Additionally, or alternatively, aggregation and analytics system 210 may generate a recommendation associated with a character, a person, a sports team, or the like. For example, aggregation and analytics system 210 may generate a recommendation to increase or decrease content including the character, the person, or the sports team. In some implementations, the recommendation may be based on a contextual analysis, a social media analysis, or another analysis. For example, aggregation and analytics system 210 may generate a recommendation to increase particular content by identifying a sentiment associated with the content or a particular character present in the content, by determining which content has received a higher quantity of positive indicators relative to other content, or by determining which content has generated more revenue relative to other content.

Additionally, or alternatively, aggregation and analytics system 210 may generate a recommendation associated with a type, a motif, a theme, an emotion, or the like, of the content. For example, aggregation and analytics system 210 may generate a recommendation to increase or decrease content of a particular type or content that includes a particular motif, theme, or emotion based on a contextual analysis or another type of analysis by determining that a type, motif, theme, or emotion of the content is associated with higher consumption, a higher level of engagement, or higher revenue relative to other content.

Additionally, or alternatively, aggregation and analytics system 210 may generate a recommendation associated with production of the content. For example, aggregation and analytics system 210 may generate a recommendation to renew or cancel content based on a sentiment analysis (e.g., by determining whether the content is associated with a positive or a negative sentiment). As another example, aggregation and analytics system 210 may generate a recommendation to initiate full production for particular pilot content (e.g., by determining whether a pilot episode or a pilot event, such as a broadcast of a live sporting event or performance event, is associated with a positive sentiment or a negative sentiment).

Additionally, or alternatively, aggregation and analytics system 210 may generate a recommendation associated with advertising. For example, aggregation and analytics system 210 may generate a recommendation to increase or decrease advertising for content on a particular distribution channel based on a social media analysis or a level of engagement (e.g., by determining whether content is associated with a high, medium, or low level of engagement). As another example, aggregation and analytics system 210 may generate a recommendation to increase or decrease a price for advertising spots during the content based on a consumption analysis (e.g., by determining a total quantity of consumers of the content or a trend in consumption for the content). As another example, aggregation and analytics system 210 may generate a recommendation of potential advertising partners based on a social media analysis (e.g., based on data mining demographics of consumers of the content).

Additionally, or alternatively, aggregation and analytics system 210 may generate a recommendation based on a characteristic of the data. For example, aggregation and analytics system 210 may generate a recommendation based on values of the data, values of the data relative to values of other data, an average value of the data, a trend in values of the data, etc.

Additionally, or alternatively, aggregation and analytics system 210 may generate a recommendation based on other data. For example, aggregation and analytics system 210 may generate a recommendation to increase or decrease content provided via a particular distribution channel or consumption channel based on cost data or revenue data (e.g., by determining that content is associated with higher costs or generates more revenue relative to other content).

In some implementations, aggregation and analytics system 210 may provide the recommendation to client device 230 (e.g. for display via a screen of client device 230).

In some implementations, aggregation and analytics system 210 may perform another action (e.g., based on a result of an analysis). For example, aggregation and analytics system 210 may transmit a message to a content producer indicating a result of an analysis and/or provide a result of an analysis for display (e.g., via a display of aggregation and analytics system 210), thereby conserving processing resources and/or reducing time associated with transmitting a result of an analysis to a content provider. As another example, aggregation and analytics system 210 may automatically increase prices for advertising spots presented during the content (e.g., by updating electronic records that identify current prices for advertising spots), thereby conserving processing resources associated with increasing prices for advertising spots and enabling real-time, or near real-time, adjustments to advertising prices.

As another example, aggregation and analytics system 210 may purchase advertising for the content (e.g., by transmitting, to an entity that sells advertising spots, a request to purchase one or more advertising spots for the content), thereby conserving processing resources associated with, and increasing an efficiency of, purchasing advertising. As another example, aggregation and analytics system 210 may schedule a meeting among multiple content producers based on a result of the analysis, such as to discuss cancelling content or creating additional content based on a result of a sentiment analysis (e.g., by comparing data from electronic calendars of the multiple content producers to identify a meeting time and by sending a meeting request to the multiple content producers). Automatically scheduling a meeting conserves processing resources associated with, and improves an efficiency of, scheduling a meeting between multiple content producers.

In some implementations, aggregation and analytics system 210 may perform an action based on a generated recommendation (e.g., to implement the recommendation). For example, aggregation and analytics system 210 may schedule distribution of content via a particular distribution channel based on generating a recommendation to distribute the content via the particular distribution channel, such as by scheduling content for re-broadcast on a TV channel during a particular time period, thereby conserving processing resources associated with analyzing the recommendation to determine an action to take based on the recommendation. As another example, aggregation and analytics system 210 may transmit a message to a provider of a TV series instructing the provider to increase the role of a particular character in the series based on generating a recommendation to increase content that includes the character, thereby conserving processing resources associated with analyzing the recommendation and transmitting a message to the provider based on analyzing the recommendation.

As another example, aggregation and analytics system 210 may automatically increase the price of advertising presented during a local sports team season, for a game where the opponent is a particular team, based on generating a recommendation to increase a price of advertising for content that includes the particular team, thereby increasing an efficiency of adjusting advertising prices by enabling real-time or near real-time price adjustments.

As another example, aggregation and analytics system 210 may automatically generate an action plan for an advertising campaign, such as an action plan to increase revenue by identifying costs and revenue associated with different content, different distribution channels, and/or consumption channels, an action plan to increase consumption or other user interactions with the content by using a result of a consumption analysis, predictive analytics, or a social media analysis, etc. Automatically generating an action plan conserves processing resources associated with analyzing a result of an analysis technique to generate an action plan. In some implementations, when generating the action plan, aggregation and analytics system 210 may generate recommendations for content to advertise, distribution channels and/or consumption channels via which to advertise the content, consumers to target with the advertising, etc.

In some implementations, when generating an action plan, aggregation and analytics system 210 may generate the action plan based on input from a user of aggregation and analytics system 210. For example, aggregation and analytics system 210 may generate the action plan based on receiving an indication from a user of aggregation and analytics system 210 to generate an action plan associated with a particular metric (e.g., increased revenue, reduced costs, increased consumption, etc.). As another example, aggregation and analytics system 210 may receive an indication from a user to generate multiple actions plans, such as a first action plan associated with a first metric and a second action plan associated with a second metric.

In some implementations, aggregation and analytics system 210 may include a data model (e.g., a logical data model or a conceptual data model) that converges content consumption data from different distribution channels and/or consumption channels, cost data, revenue data, and/or contextual data for content. In some implementations, aggregation and analytics system 210 may generate and/or provide a visual representation of relationships among different types of data and/or data from different sources. For example, aggregation and analytics system 210 may generate and/or provide a visual representation of the data model for display via client device 230. Additionally, or alternatively, aggregation and analytics system 210 may generate and/or provide a data dictionary for the data. For example, aggregation and analytics system 210 may generate and/or provide, for display via client device 230, a data dictionary.

By automatically generating a recommendation or performing an action, aggregation and analytics system 210 conserves processing resources that would otherwise be used to generate a recommendation or perform an action by manually analyzing the data using client device 230 or another device (e.g., processing resources used to perform erroneous or duplicate analyses). Furthermore, aggregation and analytics system 210 increases the efficiency of generating a recommendation or performing an action by quickly and automatically generating the recommendation or performing the action.

In this way, an aggregation and analytics system conserves processing resources associated with analyzing data from multiple sources by reducing or eliminating the use of processing resources used to analyze data from multiple sources. Furthermore, the aggregation and analytics system enables assessment of data across different distribution channels and/or different consumption channels, thereby improving analysis of data from multiple sources. Further, the aggregation and analytics system increases an efficiency of analyzing data by analyzing metrics in a consolidated manner using a single system rather than in a disparate manner using multiple systems or tools. Further, the aggregation and analytics system conserves time associated with analyzing data from multiple sources and across different distribution channels and/or consumption channels by using a single system to analyze the data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable an aggregation and analytics system to aggregate data associated with content from multiple sources and analyze relationships among the data. In addition, the aggregation and analytics system may automatically generate a recommendation for an action to perform, with respect to the content, based on analyzing the data. Further, the aggregation and analytics system may automatically perform an action based on analyzing the data, thereby increasing an efficiency of performing an action based on the recommendation.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
a memory; and
one or more processors to:
  receive, from multiple data providers or multiple platforms, data associated with content, a content provider that provides the content, and multiple channels via which the content is provided or consumed,
    the data including first data, received from a first data provider or a first platform of the multiple data providers or the multiple platforms, that is associated with a different file type than second data received from a second data provider or a second platform of the multiple data providers or the multiple platforms,
    the first data to include contextual data that identifies a context of the content,
      the contextual data including data about one or more of:
        a motif, or
        a character present in a particular scene or frame of the content, and
      the first data being identified using time-based metadata for the content,
    the second data including information relating to audience or viewership consumption of the content via two or more distribution channels, of the multiple channels, and received from an audience measurement entity,
      the two or more distribution channels including at least two of:
        a television source device,
        an over-the-top (OTT) source device, or
        a social media source device, and
    the system including a data model associated with the first data and the second data;
  aggregate the data from the multiple data providers or the multiple platforms;
  extract the data based on identifying a pattern in the aggregated data;
  identify, from the extracted data, a relationship between the first data and the second data,
    the first data and the second data being different types of data, and
    the relationship being used to determine whether an increase or decrease in content that includes a particular type of the contextual data increases or decreases the audience or viewership consumption of the content; and
  perform an action based on the relationship between the first data and the second data,
  where the one or more processors, when performing the action, are to:
    generate a recommendation to increase or decrease content that includes the particular type of the contextual data based on the relationship.

2. The system of claim 1, where the recommendation is a first recommendation, and
where the one or more processors, when performing the action, are to:
  perform descriptive analytics using data mining to analyze the first data and the second data,
  perform predictive analytics to forecast or predict additional data based on a trend associated with the first data or the second data, or generate a second recommendation based on performing the predictive analytics.

3. The system of claim 1, where the one or more processors are further to:
map the first data to the second data using one or more identifiers included in the first data and the second data; and
where the one or more processors, when aggregating the data from the multiple data providers or the multiple platforms, are to:
aggregate the first data and the second data from the multiple data providers or the multiple platforms based on mapping the first data to the second data.

4. The system of claim 1, where the one or more processors are further to:
determine a manner in which the relationship between the first data and the second data affects user interaction with the content via a social media channel; and
where the one or more processors, when performing the action, are to
generate another recommendation based on determining the manner in which the relationship between the first data and the second data affects the user interaction with the content.

5. The system of claim 1, where the one or more processors are further to:
determine whether a change in the first data corresponds to a change in the second data; and
where the one or more processors, when performing the action, are to:
perform the action based on determining whether the change in the first data corresponds to the change in the second data.

6. The system of claim 1, where the multiple channels include the two or more distribution channels and multiple consumption channels.

7. The system of claim 1, where the one or more processors are further to:
determine a manner in which the first data affects the second data; and
where the one or more processors, when identifying the relationship between the first data and the second data, are to:
identify the relationship between the first data and the second data based on determining the manner in which the first data affects the second data.

8. A method, comprising:
receiving, by a system, a first type of data from a first platform and a second type of data from a second platform,
the first type of data or the second type of data being associated with content provided by a content provider via a channel,
the first type of data being associated with a first file type,
the second type of data being associated with a second file type,
the first type of data to include contextual data that identifies a context of the content,
the contextual data including data about one or more of:
a motif, or
a character present in a particular scene or frame of the content, and
the first type of data being identified using time-based metadata for the content, and
the second type of data including information relating to audience or viewership consumption of the content via two or more distribution channels and received from an audience measurement entity,
the two or more distribution channels including at least two of:
a television source device,
an over-the-top (OTT) source device, or
a social media source device;
extracting, by the system, the first type of data and the second type of data based on identifying a pattern;
determining, by the system, a relationship between the first type of data and the second type of data based on extracting the first type of data and the second type of data,
the relationship indicating whether the first type of data affects the second type of data;
performing, by the system, an analysis of the relationship between the first type of data and the second type of data based on determining the relationship between the first type of data and the second type of data,
the relationship being used to determine whether an increase or decrease in content that includes a particular type of the contextual data increases or decreases the audience or viewership consumption of the content; and
performing, by the system, an action based on the analysis of the relationship,
where performing the action comprises:
generating a recommendation to increase or decrease content that includes the particular type of the contextual data based on the relationship.

9. The method of claim 8, where the recommendation is a first recommendation, and
where performing the action comprises:
generating a second recommendation associated with the content,
the second recommendation being based on a characteristic of the first type of data or the second type of data,
providing a result of performing first analytics to identify a difference between predicted data and received data,
providing a result of performing second analytics to predict data based on a trend associated with the first type of data or the second type of data, or
generating a third recommendation based on the result of performing the second analytics to predict the data.

10. The method of claim 8, further comprising:
determining a result of the analysis based on performing the analysis,
the result identifying a manner in which the first type of data affects the second type of data; and
where performing the action comprises:
performing the action to implement another recommendation associated with the result of the analysis.

11. The method of claim 8, further comprising:
mapping the first type of data and the second type of data based on at least one of:
the content,
a source of the content, or
the channel associated with the content; and
where determining the relationship between the first type of data and the second type of data comprises:

determining the relationship between the first type of data and the second type of data based on mapping the first type of data and the second type of data.

12. The method of claim 8, where determining the relationship between the first type of data and the second type of data comprises:
   determining that the first type of data affects the second type of data; and
   determining the relationship between the first type of data and the second type of data based on determining that the first type of data affects the second type of data.

13. The method of claim 8, where the analysis includes:
   performing a first analysis to determine a manner in which a sentiment associated with the content affects consumption of the content or revenue generated by the content, or
   performing a second analysis to determine a manner in which a level of engagement associated with the content affects the consumption of the content or the revenue generated by the content.

14. The method of claim 8, where:
   the first type of data is associated with a context of the content, and
   the second type of data is associated with revenue generated by the content.

15. A non-transitory computer-readable medium storing instructions, the instructions comprising:
   one or more instructions that, when executed by one or more processors, cause the one or more processors to:
      receive, from a plurality of sources, data associated with content, a content provider that provides the content, or multiple channels via which the content is provided or consumed,
         the data including first data associated with a first file type and second data associated with a second file type,
         the first data being a different type of data than the second data, and
         the first data to include contextual data that identifies a context of the content,
            the contextual data including data about one or more of:
               a motif, or
               a character present in a particular scene or frame of the content, and
         the first data being identified using time-based metadata for the content, and
         the second data including information relating to audience or viewership consumption of the content via two or more distribution channels, of the multiple channels, and received from an audience measurement entity,
            the two or more distribution channels including at least two of:
               a television source device,
               an over-the-top (OTT) source device, or
               a social media source device;
      identify a pattern in the first data and the second data;
      perform an analysis of the first data and the second data to determine one or more relationships between the first data and the second data based on identifying the pattern,
         the analysis being associated with causing a system to perform one or more actions based on the one or more relationships;
      determine the one or more relationships between the first data and the second data based on the analysis,
         a relationship, of the one or more relationships, being used to determine whether an increase or decrease in content that includes a particular type of the contextual data increases or decreases the audience or viewership consumption of the content, and
         the one or more relationships indicating whether the first data affects the second data; and
      perform the one or more actions based on the one or more relationships between the first data and the second data,
         where the one or more instructions, that cause the one or more processors to perform the one or more actions, cause the one or more processors to:
            generate a recommendation to increase or decrease content that includes the particular type of the contextual data based on the relationship.

16. The non-transitory computer-readable medium of claim 15, where the one or more instructions, that cause the one or more processors to perform the one or more actions, cause the one or more processors to:
   perform the one or more actions based on a recommendation associated with the analysis,
      the one or more actions including:
         scheduling the content for distribution,
         scheduling a meeting, or
         transmitting a message to the content provider.

17. The non-transitory computer-readable medium of claim 15, where the one or more instructions, when executed by the one or more processors, further cause the one or more processors to:
   map the first data, received from a first source of the plurality of sources, and the second data, received from a second source of the plurality of sources, using one or more identifiers that identify the content, the content provider, or the multiple channels; and
   where the one or more instructions, that cause the one or more processors to determine the one or more relationships, cause the one or more processors to:
      determine the one or more relationships based on mapping the first data and the second data.

18. The non-transitory computer-readable medium of claim 15, where the one or more instructions, that cause the one or more processors to perform the analysis of the first data and the second data, cause the one or more processors to:
   perform a first analysis of the first data to identify a first trend associated with the first data;
   perform a second analysis of the second data to identify a second trend associated with the second data; and
   where the one or more instructions, that cause the one or more processors to determine the one or more relationships, cause the one or more processors to:
      determine the one or more relationships between the first data and the second data based on the first analysis and the second analysis.

19. The non-transitory computer-readable medium of claim 18, where the one or more instructions, that cause the one or more processors to perform the one or more actions, cause the one or more processors to:
   generate a recommendation based on identifying the first trend or identifying the second trend.

20. The non-transitory computer-readable medium of claim 15, where the plurality of sources includes a plurality of source devices or a plurality of platforms the plurality of source devices including the television source device, the over-the-top (OTT) source device, and the social media source device.

\* \* \* \* \*